US012331915B1

(12) United States Patent
Chen

(10) Patent No.: US 12,331,915 B1
(45) Date of Patent: Jun. 17, 2025

(54) SYSTEM FOR TRANSMITTING ELECTRICITY TO AN LED NEON LAMP

(71) Applicant: Sikai Chen, Delran, NJ (US)

(72) Inventor: Sikai Chen, Delran, NJ (US)

( * ) Notice: Subject to any disclaimer, the term of this patent is extended or adjusted under 35 U.S.C. 154(b) by 0 days.

(21) Appl. No.: 18/595,643

(22) Filed: Mar. 5, 2024

(51) Int. Cl.

| | |
|---|---|
| ***F21V 23/06*** | (2006.01) |
| ***F21S 4/20*** | (2016.01) |
| ***F21Y 115/10*** | (2016.01) |
| ***H01R 13/04*** | (2006.01) |
| ***H01R 24/76*** | (2011.01) |
| ***H01R 103/00*** | (2006.01) |

(52) U.S. Cl.
CPC ................ *F21V 23/06* (2013.01); *F21S 4/20* (2016.01); *H01R 24/76* (2013.01); *F21Y 2115/10* (2016.08); *H01R 13/04* (2013.01); *H01R 2103/00* (2013.01)

(58) Field of Classification Search
CPC ..... F21V 23/06; F21S 4/20; F21S 4/22; F21S 4/26; F21S 4/28
See application file for complete search history.

(56) References Cited

U.S. PATENT DOCUMENTS

| | | | | |
|---|---|---|---|---|
| 5,628,557 A * | 5/1997 | Huang | F21S 4/28 | 362/249.14 |
| 8,864,511 B2 * | 10/2014 | Shimizu | F21V 23/006 | 439/226 |
| 9,335,009 B2 * | 5/2016 | Halliwell | F21K 9/27 | |
| 9,541,266 B2 * | 1/2017 | Bolscher | F21V 23/06 | |
| 10,408,389 B2 * | 9/2019 | Wessel | F21S 4/28 | |
| 11,255,528 B1 * | 2/2022 | Lu | F21V 23/06 | |
| 2009/0230896 A1 * | 9/2009 | Lin | F21V 23/06 | 315/324 |
| 2010/0270925 A1 * | 10/2010 | Withers | F21V 19/008 | 315/51 |
| 2013/0135852 A1 * | 5/2013 | Chan | F21V 21/002 | 362/221 |
| 2017/0198896 A1 * | 7/2017 | May | F21K 9/278 | |
| 2019/0063692 A1 * | 2/2019 | Rao | F21K 9/278 | |
| 2020/0022241 A1 * | 1/2020 | Tang | F21V 21/005 | |
| 2020/0088395 A1 * | 3/2020 | Shi | F21S 8/03 | |
| 2021/0270452 A1 * | 9/2021 | Wu | F21V 15/015 | |

FOREIGN PATENT DOCUMENTS

| | | | |
|---|---|---|---|
| DE | 202019100631 U1 * | 3/2019 | F21S 4/20 |
| WO | WO-2012109683 A1 * | 8/2012 | F16L 3/10 |

* cited by examiner

*Primary Examiner* — Alexander K Garlen
(74) *Attorney, Agent, or Firm* — Stuart M. Goldstein

(57) ABSTRACT

An LED light section is mounted on base section of an LED neon lamp. A slotted space is located within the base section, which also houses an electrical circuit board with positive and negative electrical terminals, the positive terminal aligned with one of the openings and the negative terminal aligned with a second opening. An electrical connector plate having outwardly extending positive and negative contacts is sized to fit snugly within the slotted space, with the positive and negative contacts inserted into the openings in the back wall of the slotted space such that they are in contact with the positive and negative terminals of the circuit board. In this manner, electricity is transmitted from the power source through the connector plate via the electrical contacts, and into the electrical circuit board via the electrical terminals in order to illuminate the lamp section.

4 Claims, 8 Drawing Sheets

SYSTEM FOR TRANSMITTING ELECTRICITY TO AN LED NEON LAMP

FIELD OF THE INVENTION

The present invention relates to electrical connections and specifically to the transmission of electricity to LED neon lamps from electrical power sources.

BACKGROUND OF THE INVENTION

LED (light-emitting diode) neon lamps, incandescent lights, and fluorescent units are routinely utilized for a variety of lighting purposes. However, LED neon lamps are considered the lighting means of choice, when seeking to optimize electrical efficiency. LED lighting lamps are also versatile in that they are available in a multitude of sizes, colors, and shapes and can be adjusted to alter light output.

Illumination of an LED neon lamp requires an electrical power source which provides electricity to the lamp via some type of electrical connection system. While there are electrical connection systems for LED neon lamps currently in use, these current systems have major drawbacks. For instance, the connectors which are used in these systems are usually difficult or awkward to install, requiring extra manpower and wasted labor time. Such connectors often do not maintain a secure connection and fail, especially in LED lamp systems which use printed circuit boards, well known in the art. Other connector systems require many components, including excessive wiring, all with the additional accompanying expense.

SUMMARY OF THE INVENTION

It is thus the object of the present invention to provide a system for transmitting electricity from an electrical power source to an LED neon lamp, which overcomes the limitations and disadvantages of existing systems.

This and other objects are accomplished by the present invention, a system which comprises an LED neon lamp with an LED light section mounted on a base section which has a slotted space within the base section. Two openings extend through the back wall of the slotted space. The base section also houses an electrical circuit board with positive and negative electrical terminals, the positive terminal aligned with one of the openings and the negative terminal aligned with a second opening. An electrical connector plate having outwardly extending positive and negative contacts is sized to fit snugly within the slotted space, with the positive and negative contacts inserted into the openings in the back wall of the slotted space such that they are in contact with the positive and negative terminals of the circuit board. In this manner, electricity is transmitted from the power source through the connector plate via the electrical contacts, and into the electrical circuit board via the electrical terminals in order to illuminate the lamp section.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
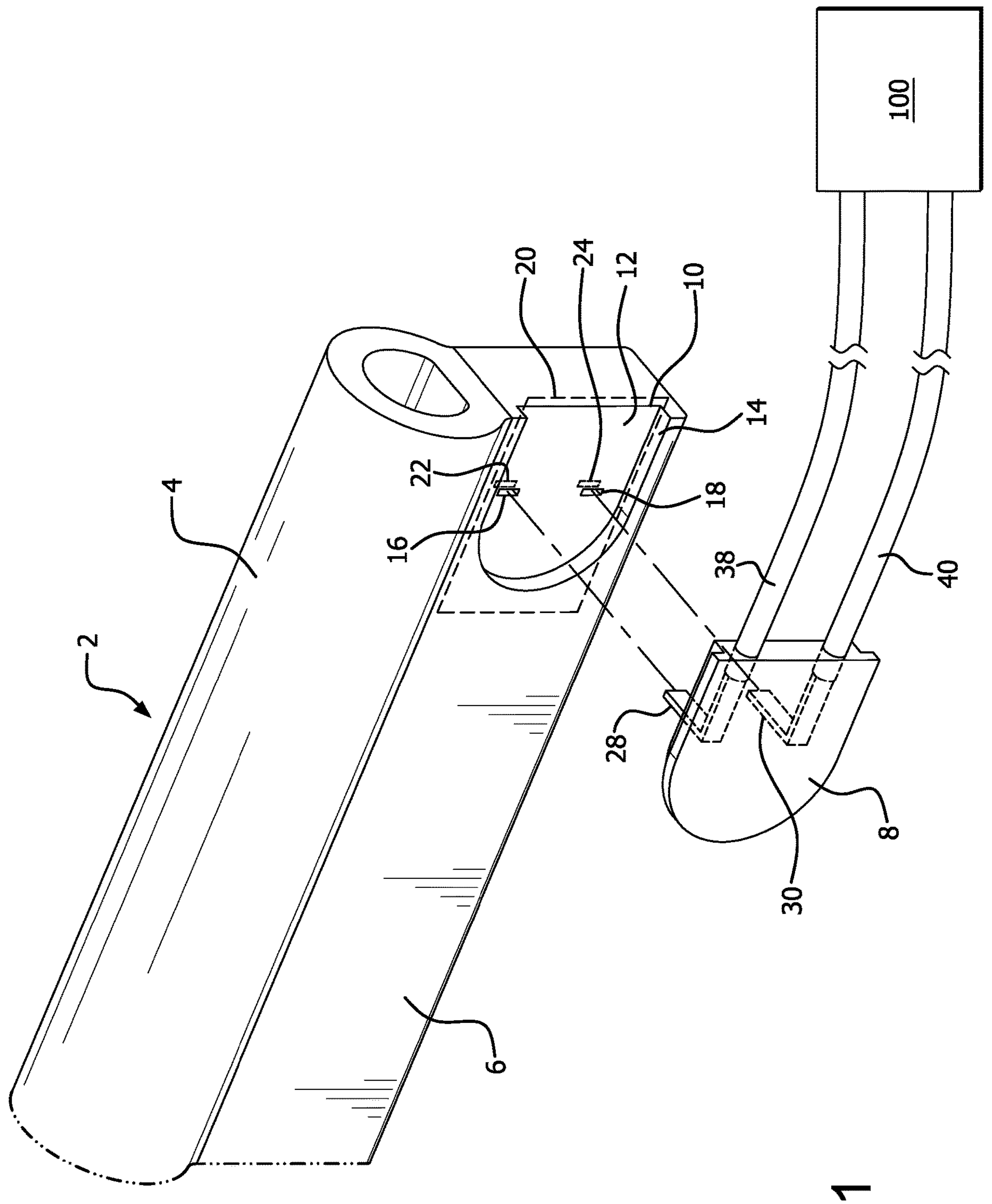
FIG. 1 is a front perspective view of the components of the present invention.

The system of the present invention for transmitting electricity from an electrical power source to an LED neon lamp comprises LED neon lamp 2 with lamp section 4 mounted on base section 6, and separate connector plate 8.

Lamp section 4 of neon lamp 2 houses the lights of the system, e.g. neon, LED, or LED neon lights. Base section 6 comprises slotted space 10 inset within the base section. Slotted space 10 has back wall 12 and lip member 14 which partially circumscribes the slotted space. Back wall 12 has first through opening 16 and second through opening 18. Electrical circuit board 20 is located within base section 6 and it has positive electrical terminal 22 and negative electrical terminal 24. Positive electrical terminal 22 is aligned with first opening 16 and negative electrical terminal 24 is aligned with the second opening 18.

Figure 2:
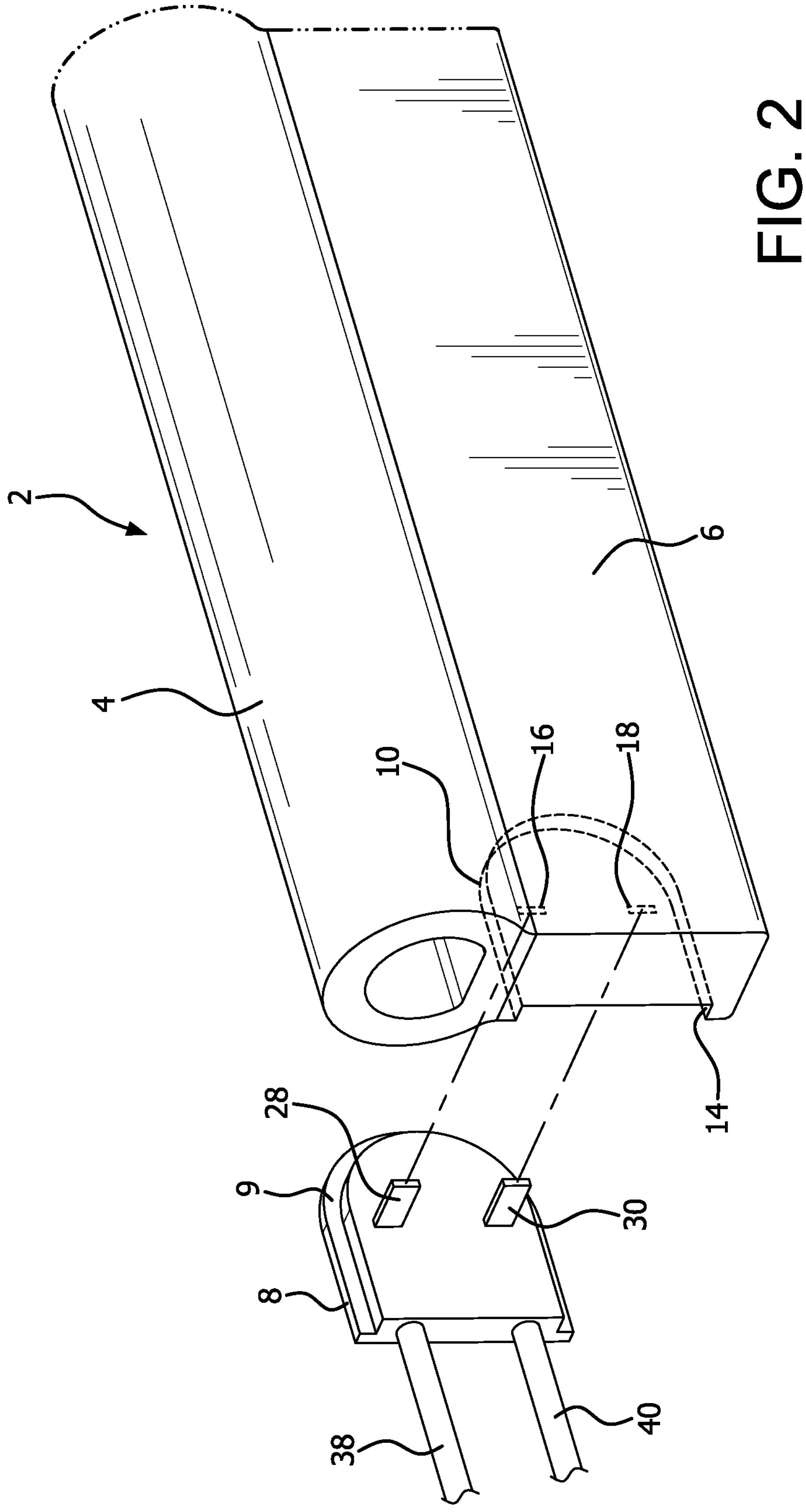
FIG. 2 is a rear perspective view of the components of the present invention.
Figure 4:
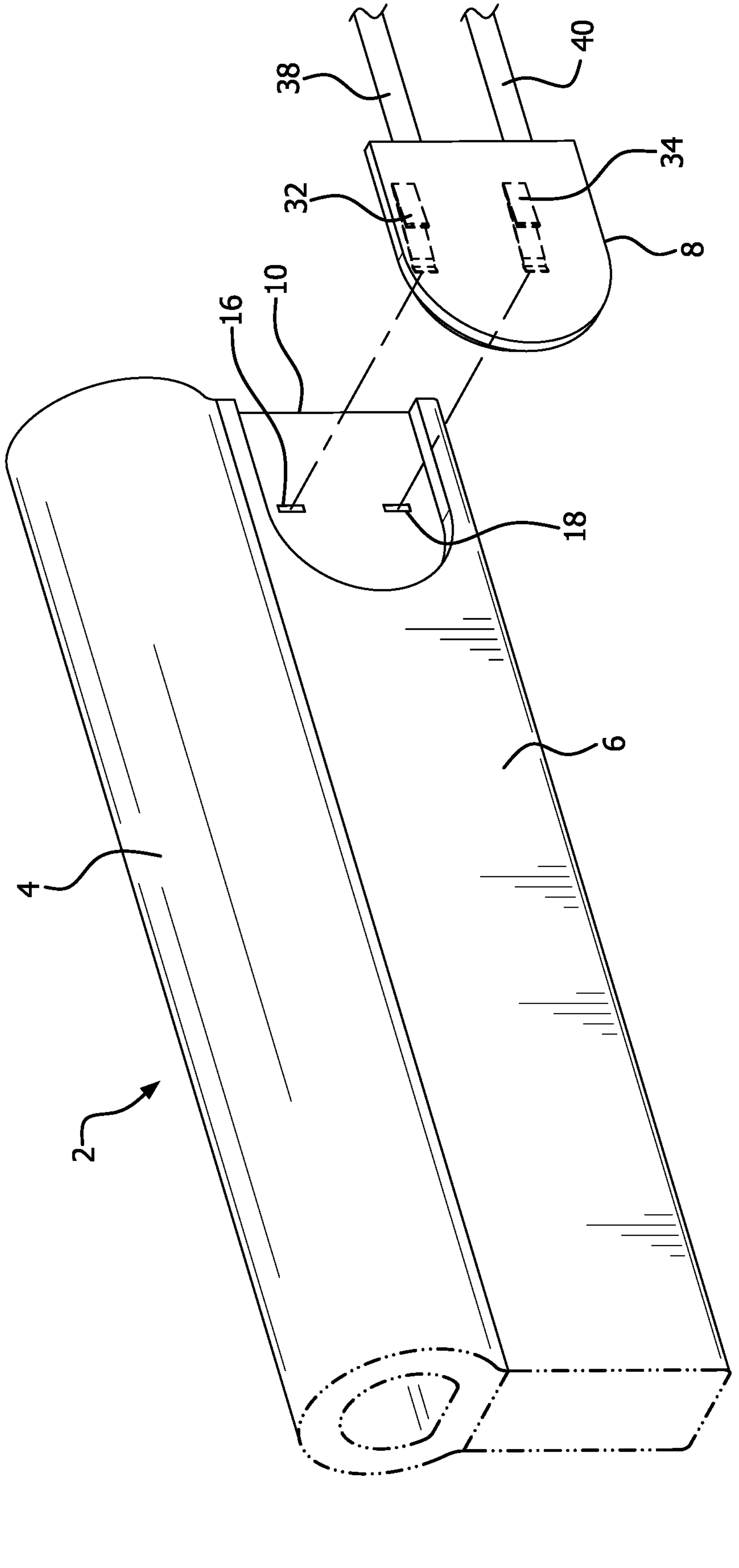
FIG. 4 is a front perspective view of the components of the present invention in their assembled state.
Figure 5:
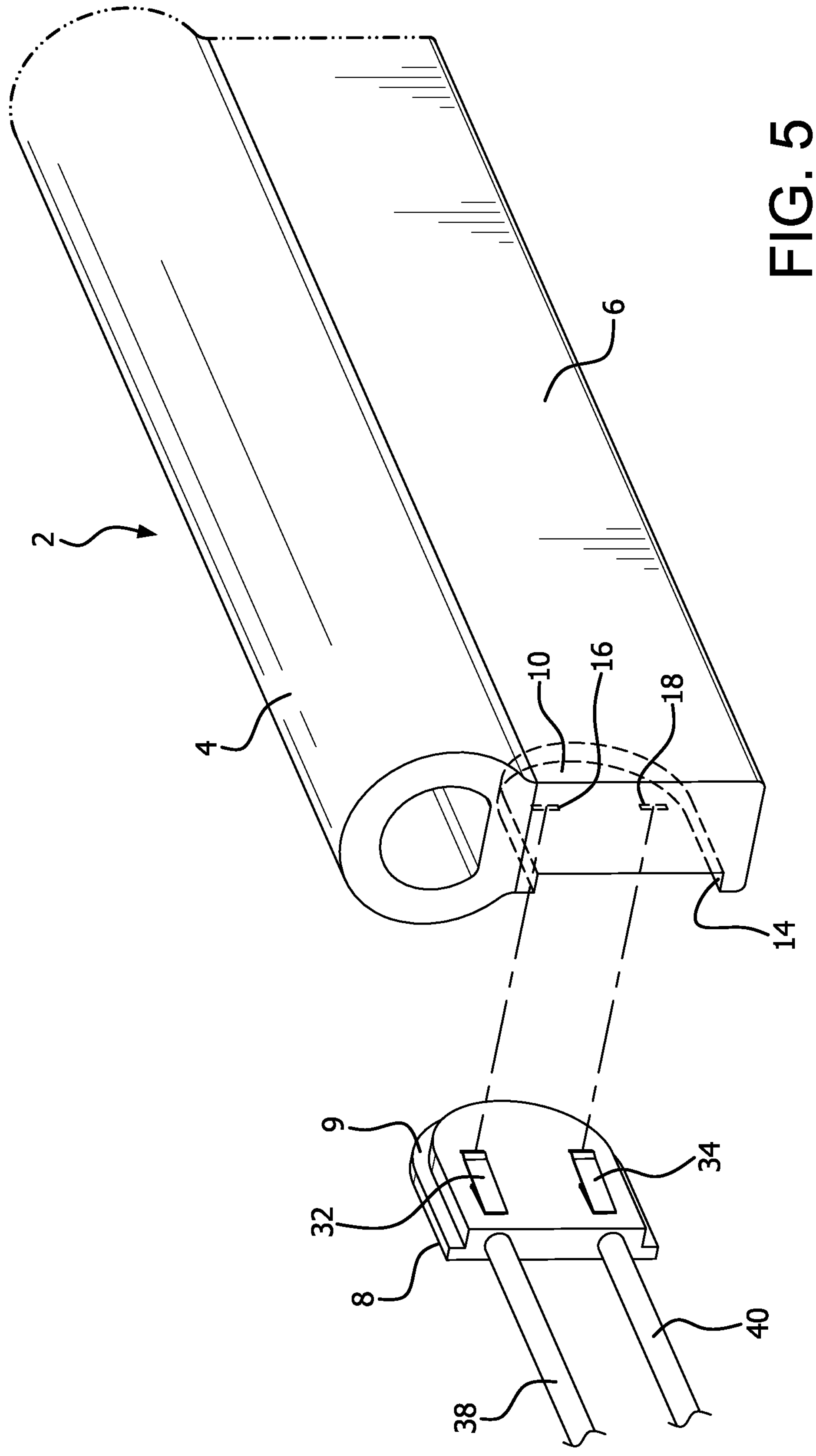
FIG. 5 is a backside rear perspective of a second embodiment of the components of the present invention.

Connector plate 8 comprises outwardly extending positive electrical contact 28 and outwardly extending negative electrical contact 30. Electrical contacts 28 and 30 are shown in FIGS. 1 and 2 as being straight electrical contact tabs. The electrical contacts can also take the form of spring loaded electrical contacts 32 and 34, as shown in FIGS. 4 and 5. The positive electrical contacts are attached to positive electrical wiring 38 and the negative electrical contacts are attached to negative electrical wiring 40. Wiring 38 and 40 lead to electrical power source 100.

Figure 3:
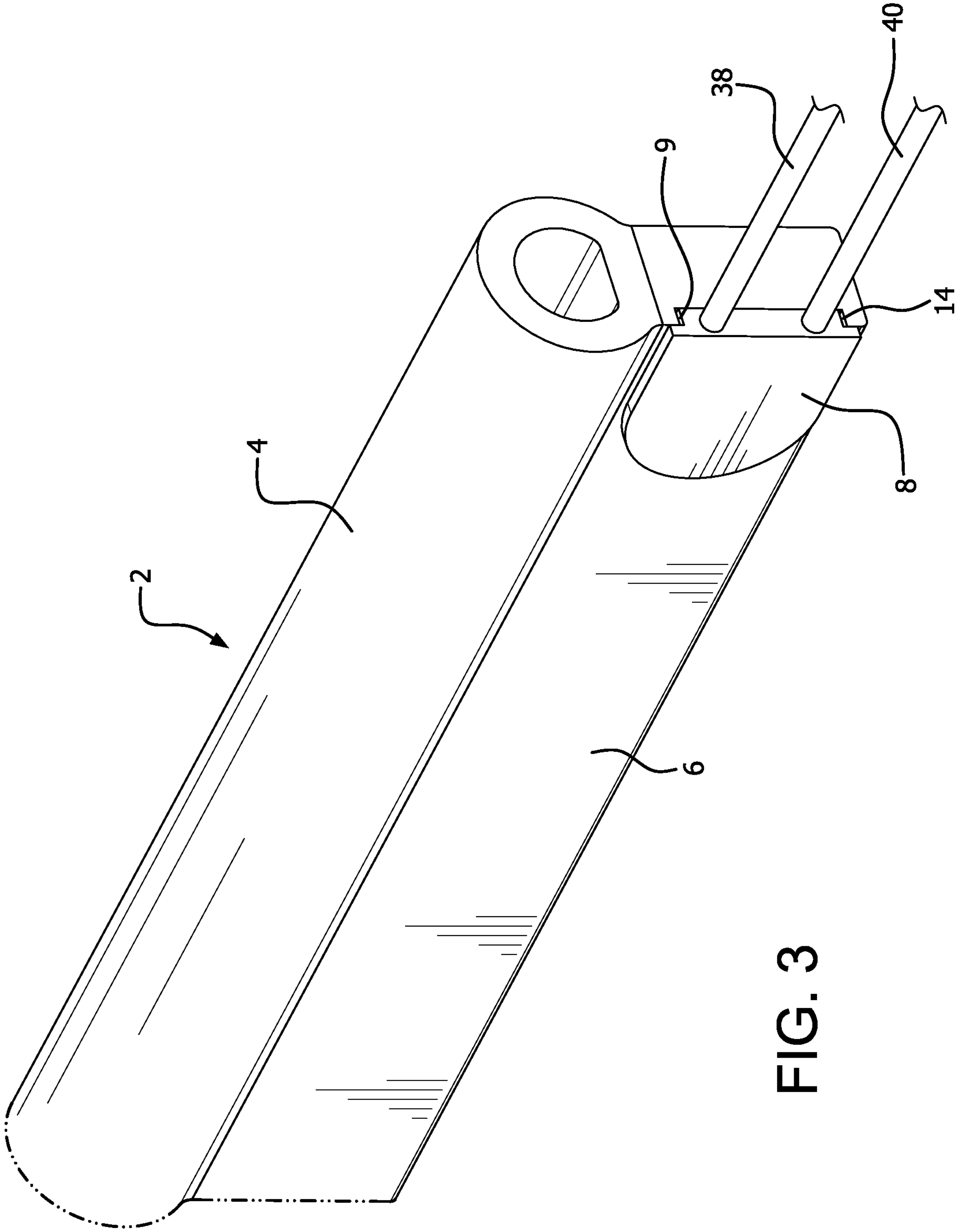
FIG. 3 is a backside rear perspective view of the components of the present invention.

In use, connector plate 8 is sized to fit snugly within slotted space 10 of base member 6. These components are secured in place by connector means which comprise recessed section 9 partially circumscribing connector plate 8 and lip member 14 of slotted space 10. As best seen in FIG. 3, when recessed section 9 is mated with lip member 14, connector plate 8 and base member 6 are securely attached.

Figure 6:
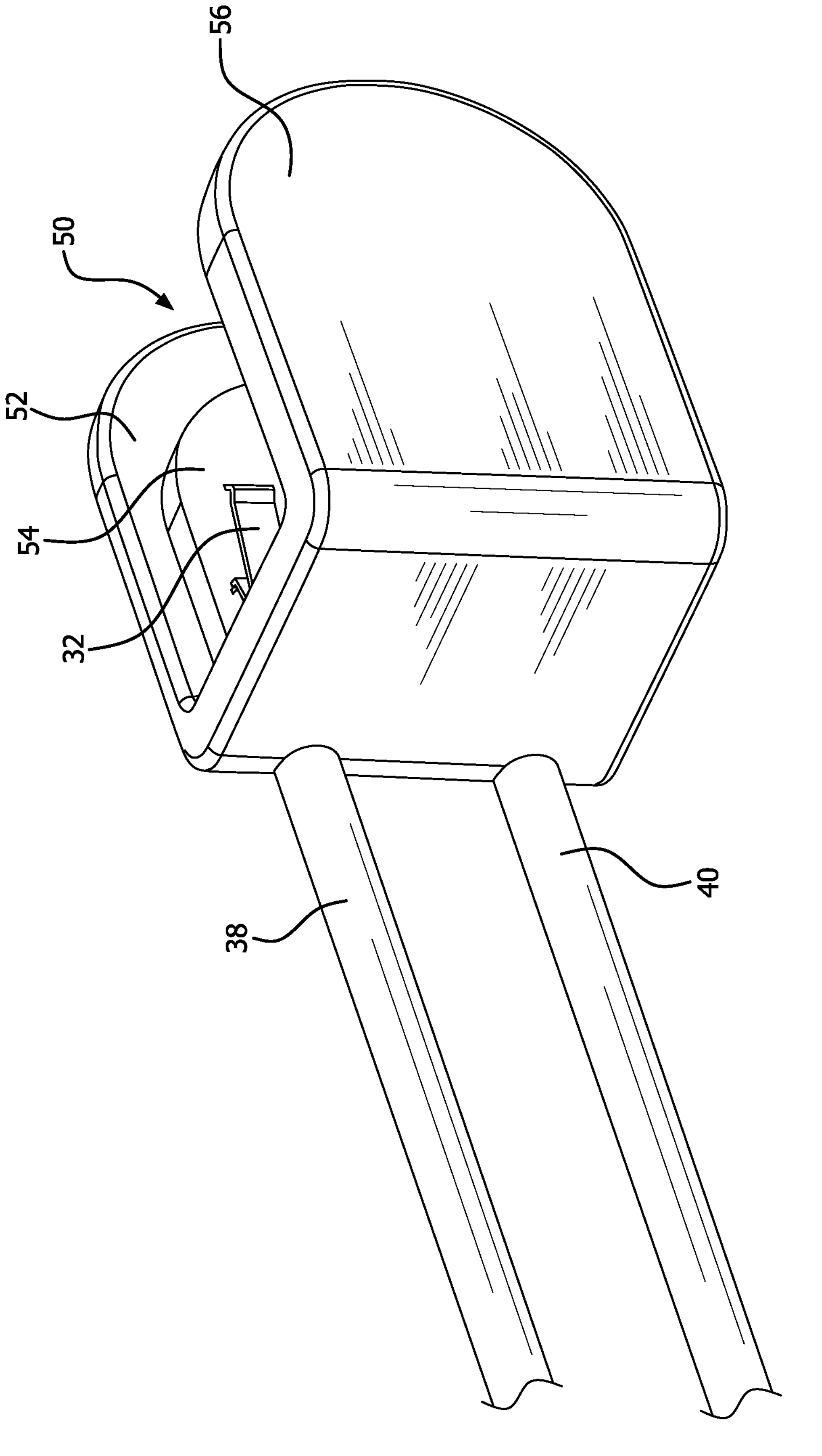
FIG. 6 is a rear perspective view of an alternate embodiment of the present invention.
Figure 7:
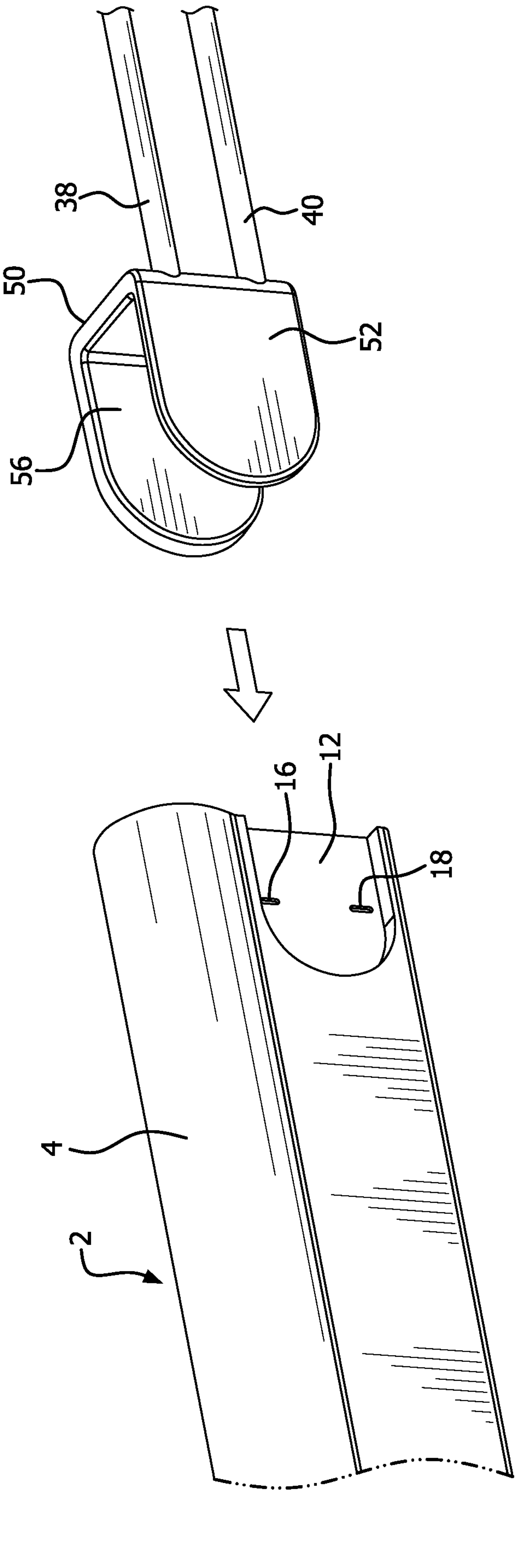
FIG. 7 is a perspective view of the manner of usage of the alternate embodiment of the present invention.
Figure 8:
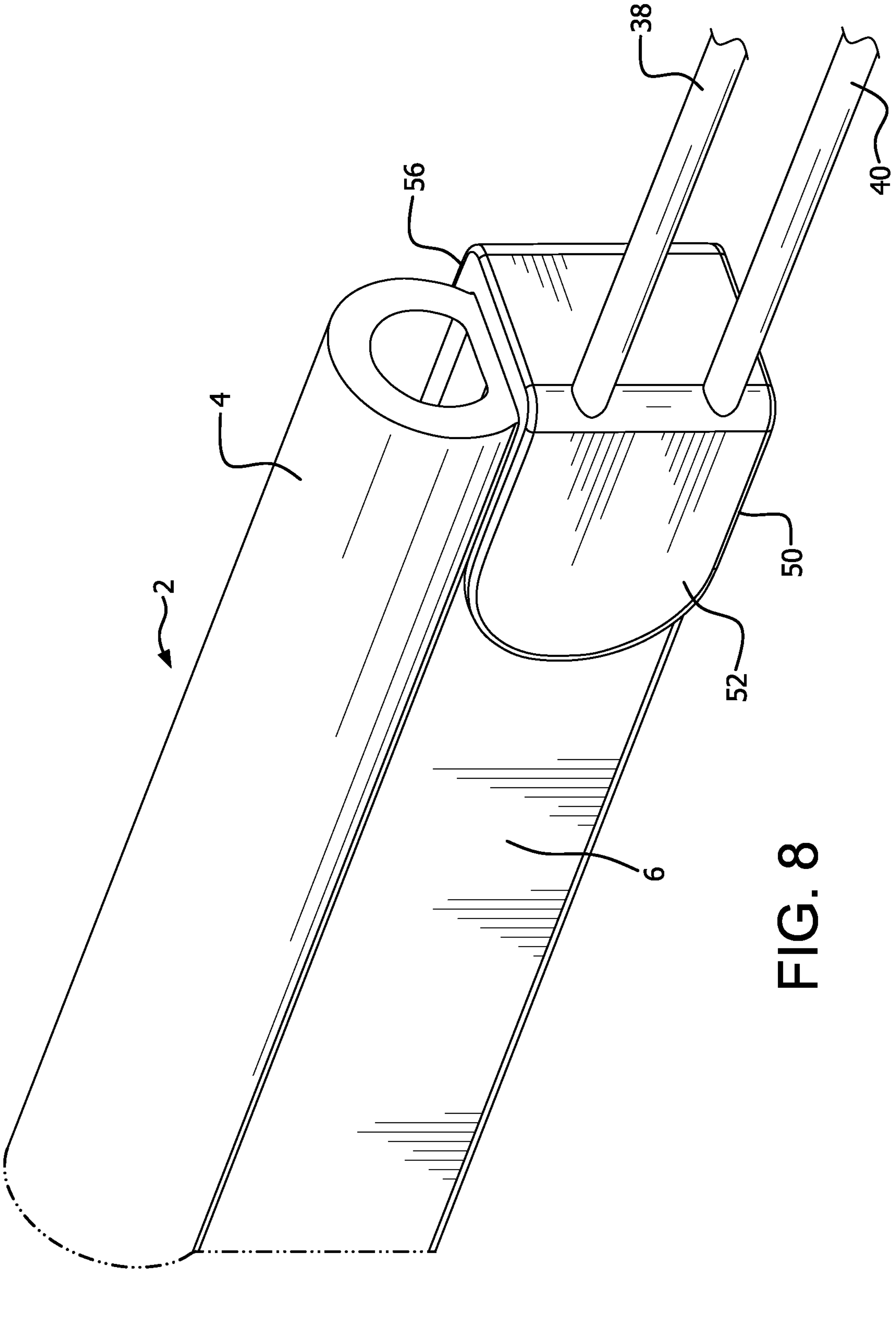
FIG. 8 is a perspective view of the alternate embodiment components of the present invention in their assembled state.

A second embodiment of the invention is illustrated in FIGS. 6-8. In this embodiment, a modified "U" shaped protective cap component 50 is provided with outwardly extending arm members 52 and 56. Connector plate 8 is attached to interior surface 54 of arm member 52. As previously described with regard to the first embodiment of the invention, connector plate 8, this time with arm member 52 overlaying the connector plate, is inserted into slotted space 10, such that both arm members 52 and 56 hug the outside surface of lamp base section 6.

The secure connection between connector plate 8 and base member 6, as seen in FIGS. 3 and 8, results in positive contact 28 (or 32) being inserted into first opening 16, resulting in the contact being adjacent to and in contact with positive terminal 22 of circuit board 20, and negative contact 30 (or 34) being inserted into second opening 18, resulting in this contact being adjacent to and in contact with negative terminal 24 of the circuit board. In this manner, the system of the present invention provides for electricity to be transmitted from power source 100, through wiring 38 and 40, through connector plate 8 via contacts 28 and 30 (or 32 and 34), and then to electrical circuit board 20 in base section 6 via positive and negative terminals 22 and 24, in order to illuminate lamp section 4 of LED neon lamp 2.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A system for transmitting electricity from an electrical power source to an LED neon lamp, said system comprising:

an LED neon lamp comprising a lamp section mounted on a base section having a slotted space which is inset within the base section, the slotted space having a back wall with first and second through openings, and an electrical circuit board located within the base section, the circuit board having a positive electrical terminal and a negative electrical terminal, the positive terminal being aligned with the first opening and the negative terminal being aligned with the second opening; and an electrical connector plate having an outwardly extending positive electrical contact and an outwardly extending negative electrical contact wherein the connector plate is sized to fit snugly within the slotted space with the positive contact inserted into the first opening and adjacent to and contacting the positive terminal, and the negative contact inserted into the second opening and adjacent to and contacting the negative terminal, such that electricity is transmitted from an electrical power source through the connector plate and to the electrical circuit board in the base section to illuminate the lamp section; and connection means for securing the base section to the connector plate, wherein the connection means comprises a recessed section partially circumscribing the connector plate, and a corresponding lip member partially circumscribing the slotted opening, wherein the recessed section of the connector plate is configured to securely mate with the lip member of the slotted opening.

2. The system as in claim 1 wherein the positive and negative electrical contacts are each contact tabs.

3. The system as in claim 1 wherein the positive and negative electrical contacts are spring loaded clips.

4. The system as in claim 1 further comprising a cap component having first and second outwardly extending arm members, the electrical connector plate being attached to the interior surface of the first arm member, whereby when the connector plate is fitted snugly within the slotted space, the first and second arm members hug the outside surface of the lamp base section.

* * * * *